United States Patent [19]

Becke et al.

[11] 3,962,319

[45] June 8, 1976

[54] α-HYDROXY-β-AMINOCARBOXYLIC ACIDS

[75] Inventors: Friedrich Becke; Helmut Fleig, both of Heidelberg, Germany

[73] Assignee: Badische Anilin- & Soda-Fabrik Aktiengesellschaft, Ludwigshafen (Rhine), Germany

[22] Filed: Jan. 19, 1972

[21] Appl. No.: 219,151

[30] Foreign Application Priority Data

Jan. 26, 1971 Germany.................... 2103453

[52] U.S. Cl..................... 260/514 J; 260/439 R; 260/514 G; 260/514; 260/534 M; 260/534 E; 260/557 R; 260/557 H; 260/559 A; 260/559 H; 260/561 A; 260/561 H
[51] Int. Cl.².............. C07C 101/30; C07C 101/72; C07C 109/097; C07C 109/06
[58] Field of Search.......... 260/514 J, 519, 534 MF

[56] References Cited
UNITED STATES PATENTS

| 2,781,377 | 2/1957 | Mannheimer | 260/401 |
| 2,781,392 | 2/1957 | Mannheimer | 260/459 |
| 3,780,099 | 12/1973 | Scandon et al. | 260/534 |

OTHER PUBLICATIONS

Monnin, Helv. Chimica Acta 39, 1721 (1956).

*Primary Examiner*—Robert Gerstl
*Attorney, Agent, or Firm*—Johnston, Keil, Thompson & Shurtleff

[57] ABSTRACT

New α-hydroxy-β-aminocarboxylic acids which are agents for masking metal ions and auxiliaries for the paper and textile industries. Other outlets are in the textile industry in dyeing and bleaching, in metal refining, in the foodstuffs industry (bottle washing) and in the field of catalysts (fuel cells, accumulators).

8 Claims, No Drawings

α-HYDROXY-β-AMINOCARBOXYLIC ACIDS

It is known from Belgian Pat. Nos. 706,033 and 724,247 that β-carbamyl-β-hydroxy-ethylamines can be prepared by reaction of glycidamide and amines and that by further reaction with acids or quaternizing agents (β-carbamyl-β-hydroxyethyl)-alkylammonium salts can be prepared.

The object of the invention is new α-hydroxy-β-aminocarboxylic acids.

We have found new α-hydroxy-β-aminocarboxylic acids of the general formula:

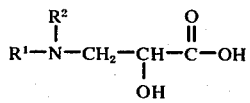
(I)

in which
$R^1$ and $R^2$ may be identical or different and each denotes an aliphatic, cycloaliphatic or araliphatic radical ($R^1$ and/or $R^2$ not being methyl);
$R^1$ is different from $R^2$ when $R^2$ denotes alkyl of two to four carbon atoms;
$R^1$ may also denote hydroxyl, hydrogen, an alkylol group or the radical

in which $R^2$ has the above meanings.

The new substances may be prepared in any suitable way, advantageously by hydrolysis of β-carbamyl-β-hydroxyethylamines or their quaternary ammonium salts. The said starting materials may be prepared for example according to the said patent specifications.

Preferred α-hydroxy-β-aminocarboxylic acids (I) and preferred starting materials of the formulae:

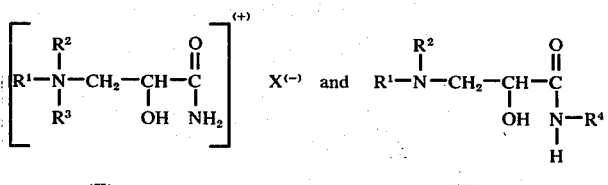

are those in whose formulae $R^1$, $R^2$ and $R^3$ may be identical or different and each denotes alkyl of one to twenty, particularly one to four, carbon atoms ($R^1$ and/or $R^2$ do not denote methyl and $R^1$ is not the same as $R^2$ when $R^2$ denotes alkyl of two to four carbon atoms), alkenyl having two to 20, particularly two to four, carbon atoms, cycloalkyl or cycloalkenyl of five or six carbon atoms, aralkyl or aralkenyl of 7 and 8 to 12 carbon atoms respectively, $R^4$ denotes hydrogen, methylol or alkoxymethyl of two to six carbon atoms and $X^{(-)}$ is the part corresponding to a negative charge of the anion of an inorganic or organic acid, $R^3$ may also be hydrogen, and $R^1$ may also denote a hydroxyl group, a hydrogen atom, an alkylol group of one to four carbon atoms of the radical

$R^1$ and/or $R^2$ may also each denote the radical

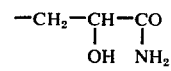

or the radical

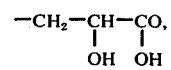

$R^1$ may also denote the radical

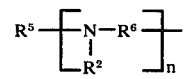

in which $R^5$ has the meanings given above for $R^2$ or denotes alkylol or alkoxymethyl of up to six carbon atoms, $R^6$ denotes alkylene of two to twelve carbon atoms and $n$ denotes an integer, preferably zero or 1. The said radicals may also contain, as substituents, groups which are inert under the reaction conditions, for example hydroxy, alkoxy of one to four carbon atoms, or carboxyl.

For example suitable starting materials are the reaction products of glycidamide, N-methylol or glycidamide and its alkyl ethers according to the above definition with ammonia, hydrazine, N,N-dimethylhydrazine, N,N'-dimethylhydrazine, or hydroxylamine; $C_2$ to $C_6$ alkylenediamines, low molecular weight alkylenepolyamines, polyethyleneimine, ethylenediamine, propylenediamine-1,2, propylenediamine-1,3, ethanolamine, diethylenetriamine, triethylene-tetramine and tetraethylenepentamine; or amines of the formula:

(IV)

The starting materials may be individual amines of formula (IV) or mixtures of amines such as are obtained for example by amination of oxoalcohols. The following are given as examples of amines of formula (IV): octylamine, decylamine, dodecylamine, tridecylamine, tetradecylamine, palmitylamine, stearylamine, methylstearylamine and oleylamine.

The starting materials of formula (III) may be converted into their secondary or tertiary ammonium salts by a known method either with an inorganic or organic acid or into their tertiary or quaternary ammonium salts with a quaternizing agent. When $R^4$ denotes hydrogen, the starting materials (II) are obtained in this way. Suitable acids are preferably strong or medium strength inorganic or organic acids, for example sulfuric acid, nitric acid, phosphoric acid, hydrogen bromide, hydrogen chloride, formic acid and acetic acid. Examples of quaternizing agents are alkyl, alkenyl, aralkyl and aralkenyl esters of strong acids; the best known agents of this type are alkyl, alkenyl, aralkyl and aralkenyl chlorides, bromides and iodides such as methyl chloride, ethyl chloride, methyl iodide, n-butyl iodide, allyl chloride, methallyl chloride, benzyl chloride and benzyl bromide, benzyl chlorides bearings methyl or ethyl groups as substituents in the nucleus, phenylallyl bromide, dialkyl esters of sulfuric acid such as diethyl sulfate, methylethyl sulfate, methyl-n-dodecyl sulfate and preferably dimethyl sulfate and esters of p-toluenesulfonic acid such as methyl p-toluenesulfonate. Preferred α-hydroxy-β-aminocarboxylic acids (I) are those bearing the abovementioned preferred radicals $R^1$ and $R^2$, for example N-octyl-β-aminolactic, N-decyl-β-aminolactic, N-dodecyl-β-aminolactic, N-tridecyl-β-aminolactic, N-tetradecyl-β-aminolactic, N-palmityl-β-aminolactic, N-stearyl-β-aminolactic, N-methyl-N-stearyl-β-aminolactic, N-oleyl-β-aminolactic, N-cyclohexyl-β-aminolactic, N-benzyl-β-aminolactic, N-cyclopentyl-β-aminolactic, N-allyl-β-aminolactic, N-methallyl-β-aminolactic, N-phenylallyl-β-aminolactic, N-methyl-N-ethyl-β-aminolactic, N-methylol-β-aminolactic, N-butoxymethyl-β-aminolactic, N-propyl-N-benzyl-β-aminolactic, N-vinyl-β-aminolactic, N-cyclohexen-(2)-yl-β-aminolactic and N-cinnamyl-β-aminolactic; (O-methyl)-β-hydroxylaminolactic, (O-butyl)-β-hydroxylaminolactic acid, lactic acids not bearing substituents on the oxygen atom of the hydroxylamino group and analogous β-hydroxylaminolactic acids bearing a propyl, allyl, cyclohexyl or benzyl group as a substituent on the nitrogen atom; β-hydrazinolactic acid; N-methyl-β-hydrazino-(N)-lactic acid, N,N'-diethyl-β-hydrazino-(N)-lactic acid, N,N'-dimethyl-β-hydrazino-(N)-lactic acid, N,N', N'-trimethyl-β-hydrazino-(N)-lactic acid, N'-benzyl-β-hydrazino-(N)-lactic acid, N'-cyclohexyl-β-hydrazino-(N)-lactic acid, and N-methyl-N'-benzyl-β-hydrazino-(N)-lactic acid; nitrilotrilactic acid, nitrilodilactic acid, N-(β'-carbamyl-β'-hydroxyethyl)-β-aminolactic acid, N,N-bis-(β'-carbamyl-β'-hydroxyethyl)-β-aminolactic acid, N'-(β'-carbamyl-β'-hydroxyethyl)-β-hydrazino-(N)-lactic acid and the corresponding N'-β'-carboxy compound, ethylenediamine tetralactic acid, propylenediamine-1,2-tetralactic acid, propylenediamine-1,3-tetralactic acid, butylenediaminetetralactic acid, the homologous trilactic, dilactic and monolactic acids and N,N,N'-tri-(β'-carbamyl-β'-hydroxyethyl)-N-monolactic, N,N'-di-(β'-carbamyl-β'-hydroxyethyl)-N-monolactic, N',N'-di-(β'-carbamyl-β'-hydroxyethyl)-N-monolactic, and N'-mono-(β'-carbamyl-β'-hydroxyethyl)-N-monolactic acids, analogous diaminolactic acids with one to three hydroxyethyl groups or methoxy or propoxy groups on the two nitrogen atoms; corresponding diaminolactic acids with one to three methyl, ethyl, isopropyl, benzyl or cyclohexyl groups on the nitrogen atoms and diaminolactic acids which bear not only the said groups but also β-carboxy-β-hydroxyethyl groups on the nitrogen atoms.

Hydrolysis of the starting materials (II) and (III) into the end products (I) is carried out by a known method, for example by a method described in Houben-Weyl, "Methoden der organischen Chemie", volume 8, pages 427 to 433. Water, basic compounds or acid compounds, preferably strong bases and mineral acids, may be used as hydrolyzing agents. Alkali metal and alkaline earth metal hydroxides such as caustic soda solution, caustic potash solution or barium hydroxide solution; alkali metal salts such as sodium carbonate; halogen hydracids such as hydrochloric acid or hydrobromic acid; sulfuric acid or phosphoric acid in dilute or advantageously in concentrated form may be used with advantage. The amount of hydrolyzing agent may be varied at will, for example from 0.1 to 10 times the stoichiometric amount based on the starting material. The reaction period and the reaction temperature may also be varied within wide limits. It is convenient to carry out the hydrolysis at a temperature of from 0° to 200°C, preferably from 20° to 120°C, at atmospheric or superatmospheric pressure, continuously or batchwise. It is advantageous to choose a hydrolysis period of from 30 minutes to 30 hours depending on the hydrolyzing agent, the temperature and the constitution of the starting material. When a starting material has more than one lactamide group, one lactamide group or some or all of the lactamide groups may be hydrolyzed by appropriate variants, for example raising the temperature, using a stronger hydrolyzing agent, using larger amounts of hydrolyzing agent or using a longer hydrolysis period. The resultant hydrolysis mixture may be worked up by conventional methods, for example by concentrating the solution and filtering or extracting the end product, if desired by fractional distillation in vacuo. The use of a cation exchanger to remove alkali metal ions has proved to be suitable in many cases after an alkaline hydrolysis. End products in which there is a large aliphatic radical, for example the stearyl group, or an araliphatic radical attached to the nitrogen atom, dissolve in various organic solvents and can therefore be extracted by means of a suitable solvent (after adding the equivalent amount of acid to the alkaline salt solution and concentrating the same) and obtained free from inorganic ions. In acid hydrolysis, the end product is formed in addition to corresponding ammonium salts. Working up such mixtures as have an end product, for example a stearyl derivative, which is soluble in organic solvents may be carried out by neutralization and extraction with a suitable solvent, for example an alcohol such as ethanol.

The object of producing end products (I) is to provide agents for masking metal ions, particularly heavy metal cations, by complex formation in aqueous solution, which have a higher complex-forming capacity and which are more widely applicable then prior art agents. The end products (I) have greater importance as complex-forming substances the greater is the ratio of the number of β-carboxy-β-hydroxyethyl groups to the number of basic nitrogen atoms and the greater is the ratio of these nitrogen atoms to the number of carbon atoms in the molecule. Compounds (I) are strong complexing agents for magnesium, calcium, aluminum, barium and for heavy metal ions including for example nickel, cobalt, copper, chromic, cerium and particularly ferric ions. They have the advantage over the starting materials (II) and (III) that they mask metal cations at above pH 9, preferably at from pH 10.5 to 12.5. They may be used particularly as masking agents for iron in aqueous solutions and suspensions where the iron would otherwise be troublesome, for example in the paper and textile industries. They are capable (per gram-mole of end product (I) with one α-hydroxycarboxylic acid group) at 20° C and at a pH of from 4 to 11.5 of masking amounts of about 2 grams-moles of $Fe^{(+++)}$. 1 gram-mole of nitrilotrilactic acid for example masks 6 gram-moles of $Fe^{(+++)}$ in the said pH range. Ethylenediamino-tetralactic acid masks 8, N-benzylnitrilodilactic acid 4 and N-cyclohexylnitrilodilactic acid 4 gram-moles of $Fe^{(+++)}$ per gram-mole of end product (I). 1 gram-mole of β-stearylaminomonolactic acid accordingly extracts 2 gram-moles of $Fe^{(+++)}$ from aqueous solutions in the said pH range by complex formation. The agent has a quantitative effect even in great dilution and the same relations therefore hold good in very dilute aqueous solution.

For analytical purposes it is often necessary to mask relatively large amounts of ferric iron in up to about 0.5% concentration so that detection of other constituents such as alkaline earth metals is not disturbed. The end products (I) according to the invention are very useful here.

Moreover it is to be emphasized that compounds according to the invention have good compatibility as masking agents with other agents and that impairment of the effect by the presence of other chemicals, for example oxidizing agents for oxidizing $Fe^{(++)}$ to $Fe^{(+++)}$ has not so far been observed and as a rule need not be feared. This insensitivity is of particular advantage because it permits successful combination with other masking agents, for example with those of the ethylenediamine type, which are especially suitable for alkaline earth metals, or with sorbitol, by which the complex-forming capacity may be increased in the alkaline range.

Moreover, the new acids may be used as assistants, especially in the textile industry in dyeing and bleaching, in metal refining, in the foodstuffs industry (washing beverage glasses) and in the field of catalysts (fuel cells, accumulators).

The invention is illustrated by the Examples.

The parts specified in the Examples are by weight.

EXAMPLE 1

28 Parts of nitrilotrilactamide and 34 parts of potassium hydroxide in 140 parts of water are kept for 16 hours at 100°C until evalution of ammonia has ceased. The solution is poured over 400 parts of a cation exchanger in the form of an aliphatic carboxylic acid resin, available commercially as AMBERLITE IRC-84, and concentrated. The end product is precipitated and is dried in vacuo at about 70° to 80°C. 26 parts of nitrilotrilactic acid is obtained having a melting point of 110° to 125°C with decomposition.

EXAMPLE 2

41 Parts of ethylenediaminetetralactamide and 35 parts of potassium hydroxide in 160 parts of water are kept at 100°C for 18 hours until the evolution of ammonia ceases. A solution of ethylenediaminetetralactic acid free from potassium ions is obtained by treatment with 400 parts of a cation exchanger in the form of an aliphatic carboxylic acid resin available commercially under the name AMBERLITE IRC-84. After working up as described in Example 1, 36 parts of ethylene diaminetetralactic acid is obtained having a melting point of 125° to 135°C with decomposition.

EXAMPLE 3

36 Parts of β-stearylaminomonolactic acid amide and 12 parts of potassium hydroxide are kept in 100 parts of water at 100°C for 19 hours at 100°C until evolution of ammonia has ended. The mixture is neutralized with the equivalent amount of sulfuric acid and concentrated, and the deposited end product is crystallized out and dried. 33 parts of β-stearylaminomonolactic acid is obtained having a melting point of 155° to 165°C with decomposition.

EXAMPLE 4

28 Parts of N-benzylnitrilodilactamide and 23 parts of potassium hydroxide in 100 parts of water is kept at 100°C for 20 hours until evolution of ammonia has ended. The solution is poured over 300 parts of a cation exchanger in the form of an aliphatic carboxylic acid resin obtainable commercially under the name AMBERLITE IRC-84 and concentrated. 10 parts of N-benzylnitrilodilactic acid is obtained having a melting point of 90° to 105°C with decomposition.

EXAMPLE 5

20 Parts of N-cyclohexylnitrilodilactamide and 23 parts of potassium hydroxide in 100 parts of water are kept for 24 hours at 100°C until the evolution of ammonia has ceased. A solution devoid of potassium ions is obtained by treatment with 300 parts of a cation exchanger in the form of an aliphatic carboxylic acid resin obtainable commercially under the name AMBERLITE IRC-84. After working up as described in Example 1, 8 parts of N-cyclohexylnitrilodilactic acid is obtained having a melting point of 135° to 145°C with decomposition.

We claim:

1. An α-hydroxy-β-aminocarboxylic acid of the formula:

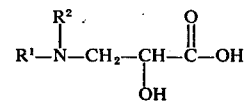

in which $R^1$ and $R^2$ may be identical or different and each denotes alkenyl of two to twenty carbon atoms, cycloalkyl or cycloalkenyl of five or six carbon atoms, or aralkyl of seven to 12 carbon atoms or aralkenyl of eight to 12 carbon atoms.

2. An α-hydroxy-β-aminocarboxylic acid of the formula:

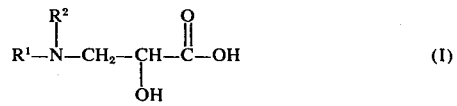

$R^1$ and/or $R^2$ may each denote the radical

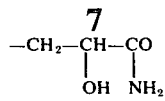

or the radical

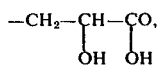

R$^1$ may also denote hydrogen, a hydroxyl group, alkylol of one to four carbon atoms or the radical

or the radical

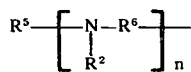

in which R$^2$ in said two last-mentioned radicals denotes alkyl of two to 20 carbon atoms, alkenyl of two to 20 carbon atoms, cycloalkyl or cycloalkenyl respectively of five or six carbon atoms, aralkyl of seven to 12 carbon atoms, aralkenyl of eight to 12 carbon atoms, the radical

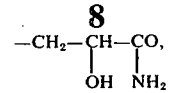

or the radical

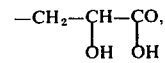

in which R$^5$ denotes the above meanings for R$^2$ or alkylol or alkoxy-methyl of up to six carbon atoms, R$^6$ denotes alkylene of two to 12 carbon atoms and $n$ denotes zero or 1.

3. An α-hydroxy-β-aminocarboxylic acid selected from the group consisting of:
   a. nitrilotrilactic acid,
   b. ethylene diaminetetralactic acid,
   c. β-stearylaminolactic acid,
   d. N-benzylnitrilodilactic acid, and
   e. N-cyclohexylnitrilodilactic acid.

4. A compound as claimed in claim 3 wherein said acid is nitrilotrilactic acid.

5. A compound as claimed in claim 3 wherein said acid is ethylene diaminetetralactic acid.

6. A compound as claimed in claim 3 wherein said acid is β-stearylaminolactic acid.

7. A compound as claimed in claim 3 wherein said acid is N-benzylnitrilodilactic acid.

8. A compound as claimed in claim 3 wherein said acid is N-cyclohexylnitrilodilactic acid.

* * * * *